United States Patent
Park et al.

(10) Patent No.: US 9,880,339 B2
(45) Date of Patent: Jan. 30, 2018

(54) BACKLIGHT UNIT AND DISPLAY DEVICE HAVING THE SAME

(71) Applicant: Samsung Display Co., Ltd., Yongin-Si, Gyeonggi-Do (KR)

(72) Inventors: Young-min Park, Hwaseong-si (KR); Luly Lee, Yongin-si (KR); Eunju Nam, Seoul (KR); Min-young Song, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/191,667

(22) Filed: Jun. 24, 2016

(65) Prior Publication Data

US 2017/0123133 A1    May 4, 2017

(30) Foreign Application Priority Data

Nov. 4, 2015    (KR) .................. 10-2015-0154610

(51) Int. Cl.
*F21V 8/00*    (2006.01)
*G02F 1/1335*    (2006.01)

(52) U.S. Cl.
CPC ......... *G02B 6/0031* (2013.01); *G02B 6/0078* (2013.01); *G02B 6/0085* (2013.01); *G02B 6/0091* (2013.01); *G02F 1/1335* (2013.01); *G02F 1/133553* (2013.01)

(58) Field of Classification Search
CPC .. G02B 6/0091; G02B 6/0085; G02B 6/0031; G02B 6/0078; G02F 1/133553; G02F 1/133605; G02F 1/1335; G02F 2001/1352
See application file for complete search history.

(56) References Cited

U.S. PATENT DOCUMENTS

| | | | |
|---|---|---|---|
| 7,413,334 B2 * | 8/2008 | Baba .................... | G02B 6/0021 362/600 |
| 7,632,002 B1 * | 12/2009 | Park .................... | G02B 6/0078 349/65 |
| 7,920,228 B2 * | 4/2011 | Bae ....................... | G02F 1/1333 349/73 |

(Continued)

FOREIGN PATENT DOCUMENTS

| KR | 1020090063464 A | 6/2009 |
|---|---|---|
| KR | 10-0926470 B1 | 11/2009 |

(Continued)

*Primary Examiner* — Daniel Walsh

(74) *Attorney, Agent, or Firm* — Cantor Colburn LLP

(57) ABSTRACT

A display device includes a first display panel, a second display panel disposed to be spaced apart from the first display panel, a first light guide plate which is under the first display panel and provides light thereto, a second light guide plate which is under the second display panel and provides light thereto, a light source unit which is commonly disposed under the first and second light guide plates and generates and provides the light to the first and second light guide plates, and a reflective member which is disposed on the light source unit and is commonly disposed on the first and second light guide plates, the reflective member defining a first curved surface which reflects the light to the first light guide plate and a second curved surface which reflects the light to the second light guide plate.

22 Claims, 10 Drawing Sheets

(56) References Cited

U.S. PATENT DOCUMENTS

| | | | | |
|---|---|---|---|---|
| 8,523,420 B2* | 9/2013 | Baek | G02B 6/0011 | 362/616 |
| 8,641,219 B1* | 2/2014 | Johnson | G02B 6/0021 | 362/97.3 |
| 2003/0063456 A1* | 4/2003 | Katahira | G02B 6/0046 | 362/23.16 |
| 2003/0231483 A1* | 12/2003 | Higashiyama | G02B 6/0038 | 362/610 |
| 2004/0125269 A1* | 7/2004 | Kim | G02F 1/133604 | 349/58 |
| 2005/0151895 A1* | 7/2005 | Fukuyoshi | G02F 1/133308 | 349/58 |
| 2005/0213311 A1* | 9/2005 | Lee | G02B 6/0068 | 362/23.18 |
| 2005/0231980 A1* | 10/2005 | Ueda | G02B 6/0055 | 362/614 |
| 2006/0012733 A1* | 1/2006 | Jin | G02F 1/13336 | 349/73 |
| 2006/0020559 A1* | 1/2006 | Steinmetz | G06F 21/34 | 705/67 |
| 2006/0262565 A1* | 11/2006 | Shimura | G02B 6/0056 | 362/616 |
| 2007/0019393 A1* | 1/2007 | Tsai | G02B 6/0055 | 362/23.15 |
| 2007/0081111 A1* | 4/2007 | Chang | G02B 6/0055 | 349/62 |
| 2007/0097504 A1* | 5/2007 | Li | G02B 5/3025 | 359/485.03 |
| 2008/0186736 A1* | 8/2008 | Rinko | G02B 6/0036 | 362/615 |
| 2008/0315070 A1* | 12/2008 | Lee | G01J 1/04 | 250/205 |
| 2011/0258121 A1* | 10/2011 | Kauniskangas | G06Q 20/20 | 705/67 |
| 2011/0310331 A1* | 12/2011 | Heo | G02F 1/133615 | 349/64 |
| 2012/0105762 A1* | 5/2012 | Que | G02F 1/133615 | 349/60 |
| 2012/0162269 A1* | 6/2012 | Bohn | G02B 26/005 | 345/690 |
| 2013/0077341 A1* | 3/2013 | Kawai | G09F 7/08 | 362/602 |
| 2015/0042919 A1* | 2/2015 | Im | G02F 1/133608 | 349/58 |
| 2017/0123133 A1* | 5/2017 | Park | G02B 6/0031 | |

FOREIGN PATENT DOCUMENTS

| | | |
|---|---|---|
| KR | 1020130019900 A | 2/2013 |
| KR | 10-1428051 B1 | 8/2014 |

* cited by examiner

BACKLIGHT UNIT AND DISPLAY DEVICE HAVING THE SAME

This application claims priority to Korean Patent Application No. 10-2015-0154610, filed on Nov. 4, 2015, and all the benefits accruing therefrom under 35 U.S.C. § 119, the content of which in its entirety is herein incorporated by reference.

BACKGROUND

1. Field

The invention relates to a backlight unit and a display device having the same. More particularly, the invention relates to a backlight unit capable of reducing a manufacturing cost thereof and providing ease of controlling a brightness thereof, and a display device having the backlight unit.

2. Description of the Related Art

As the market demand for a display device including two or more display panels continues to increase, a single display device including two or more display panels has been developed. To manufacture the single display device including two or more display panels, a number of elements for the display device, such as a bottom chassis, a mold frame, a top chassis, a light source unit, etc., is multiplied by the number of the display panels, and thus an overall manufacturing cost of the display device increases due to the increase in the number of components of the display device.

SUMMARY

One or more exemplary embodiment of the invention provides a backlight unit capable of reducing a manufacturing cost thereof and providing ease of controlling a brightness thereof.

One or more exemplary embodiment of the invention provides a display device having the backlight unit.

Exemplary embodiments of the invention provide a display device including a first display panel which displays an image with light, a second display panel which displays an image with the light and is spaced apart from the first display panel, a first light guide plate which is disposed under the first display panel and provides the light thereto, a second light guide plate which is disposed under the second display panel and provides the light thereto, a light source unit commonly disposed under the first and second light guide plates, the light source unit generating and providing the light to the first and second light guide plates, and a reflective member disposed on the light source unit and commonly disposed on the first and second light guide plates, the reflective member defining a first curved surface thereof which reflects the light to the first light guide plate and a second curved surface thereof which reflects the light to the second light guide plate.

In a thickness direction of the display device, the first curved surface extends in a direction toward the light source unit from an upper surface of the first light guide plate which is closest to the first display panel and the second curved surface extends in a direction toward the light source unit from an upper surface of the second light guide plate which is closest to the second display panel.

In a thickness direction of the display device, each of the first and second curved surfaces may have a concave shape.

The first light guide plate may be spaced apart from the second light guide plate in a first direction, and each of the first and second curved surfaces may be curved along the first direction and extends in a second direction crossing the first direction.

The reflective member commonly disposed on the first and second light guide plates may be movable in a direction toward the first light guide plate from the second light guide plate and a direction toward the second light guide plate from the first light guide plate.

The light source commonly disposed under the first and second light guide plates may be movable in unit moves to a direction toward the first light guide plate from the second light guide plate and a direction toward the second light guide plate from the first light guide plate.

The display device may further include a bottom chassis in which is accommodated the first light guide plate, the second light guide plate, the light source unit commonly disposed under the first and second light guide plates, and the reflective member commonly disposed on the first and second light guide plates.

The light source unit commonly disposed on the first and second light guide plates may include a light source which generates and emits the light to the reflective member commonly disposed on the first and second light guide plates, and a printed circuit board on which is mounted the light source, the printed circuit board disposed between the light source and the bottom chassis.

The display device may further include a heat transfer member disposed between the printed circuit board and the bottom chassis, the heat transfer member commonly disposed under the first and second light guide plates.

The display device may further include a top chassis commonly disposed on the first and second display panels spaced apart from each other. The spaced apart first and second display panels may define a space therebetween. The top chassis may define a first opening thereof which exposes a display area of the first display panel, a second opening thereof which exposes a display area of the second display panel, and a cover portion thereof which is disposed overlapping the space between the first and second display panels.

In a top plan view of the display device, the cover portion, the reflective member commonly disposed on the first and second light guide plates, and the light source unit are overlapped with each other.

The first display panel and the second display panel may be disposed in a same plane.

The first display panel may be disposed in a first imaginary plane, the second display panel may be disposed in a second imaginary plane different from the first imaginary plane, and an angle between the first imaginary plane and the second imaginary plane may be smaller than about 180 degrees.

The first light guide plate may be spaced apart from the second light guide plate in a first direction. The light source unit may include plural light sources which generate and emit the light to the reflective member commonly disposed on the first and second light guide plates, the plural light sources including first light sources arranged in a second direction crossing the first direction, second light sources arranged in the second direction and spaced apart from the first light sources in the first direction, and a printed circuit board on which the first and second light sources are mounted.

Exemplary embodiments of the invention provide a display device including a first display panel which displays an image with light, a second display panel which display an image with the light and is spaced apart from the first display panel in a first direction, a first light guide plate which is disposed under the first display panel and provides the light to the first display panel, a second light guide plate which is disposed under the second display panel and provides the light to the second display panel, a light source unit commonly disposed under the first and second light guide plates, the light source unit generating and providing the light to the first and second light guide plates, and a reflective member which is disposed on the light source unit and is commonly disposed on the first and second light guide plates, the reflective member reflecting the light to the first and second light guide plates. At least one of the light source unit and the reflective member is movable with respect to the other one of the light source unit and the reflective member, in a direction parallel to the first direction.

The reflective member may define in a thickness direction of the display device, a first surface thereof which reflects the light to the first light guide plate and curved to the light source unit from an upper surface of the first light guide plate, and a second surface thereof which reflects the light to the second light guide plate and curved to the light source unit from an upper surface of the second light guide plate.

The reflective member may define an edge thereof at which the first surface meets the second surface, the edge extending in a second direction crossing the first direction. In a state of the display device in which the edge is overlapped with a center portion of the light source unit in a top plan view of the display device, an amount of the light provided to the first light guide plate is equal to an amount of the light provided to the second light guide plate, and in a state of the display device in which the edge is not overlapped with the center portion of the light source unit in the top plan view of the display device, the amount of the light provided to the first light guide plate is different from the amount of the light provided to the second light guide plate.

The display device may further include a top chassis commonly disposed on the first and second display panels spaced apart from each other. The spaced apart first and second display panels may define a space therebetween. The top chassis may define a first opening thereof which exposes a display area of the first display panel, a second opening thereof which exposes a display area of the second display panel, and a cover portion thereof which is disposed overlapping the space between the first and second display panels.

In a top plan view of the display device, the cover portion, the reflective member commonly disposed on the first and second light guide plates, and the light source unit commonly disposed under the first and second light guide plates are overlapped with each other.

Exemplary embodiments of the invention provide a backlight unit including a first light guide plate, a second light guide plate which is disposed spaced apart from the first light guide plate, a reflective member disposed between the first light guide plate and the second light guide plate, and a light source unit which is commonly disposed under the first and second light guide plates and provides the light to the reflective member. The reflective member defines a first surface thereof extending from an upper surface of the first light guide plate to the light source unit to face the first light guide plate, and a second surface thereof extending from an upper surface of the second light guide plate to the light source unit to face the second light guide plate. The first surface is connected to the second surface.

According to one or more exemplary embodiment of the invention, the display device including two or more display panels includes one single mold frame, one single top chassis, and one single light source unit. That is, each element of the display device is singularly provided regardless of the number of the display panels, and thus the manufacturing cost of the display device may be reduced.

In addition, the user may easily control brightness of the image displayed through each of the display panels by controlling the position of one of the reflective member and the light source unit with respect to the other of reflective member and the light source unit.

BRIEF DESCRIPTION OF THE DRAWINGS

The above and other advantages of the present disclosure will become readily apparent by reference to the following detailed description when considered in conjunction with the accompanying drawings where.

DETAILED DESCRIPTION

Figure 1:
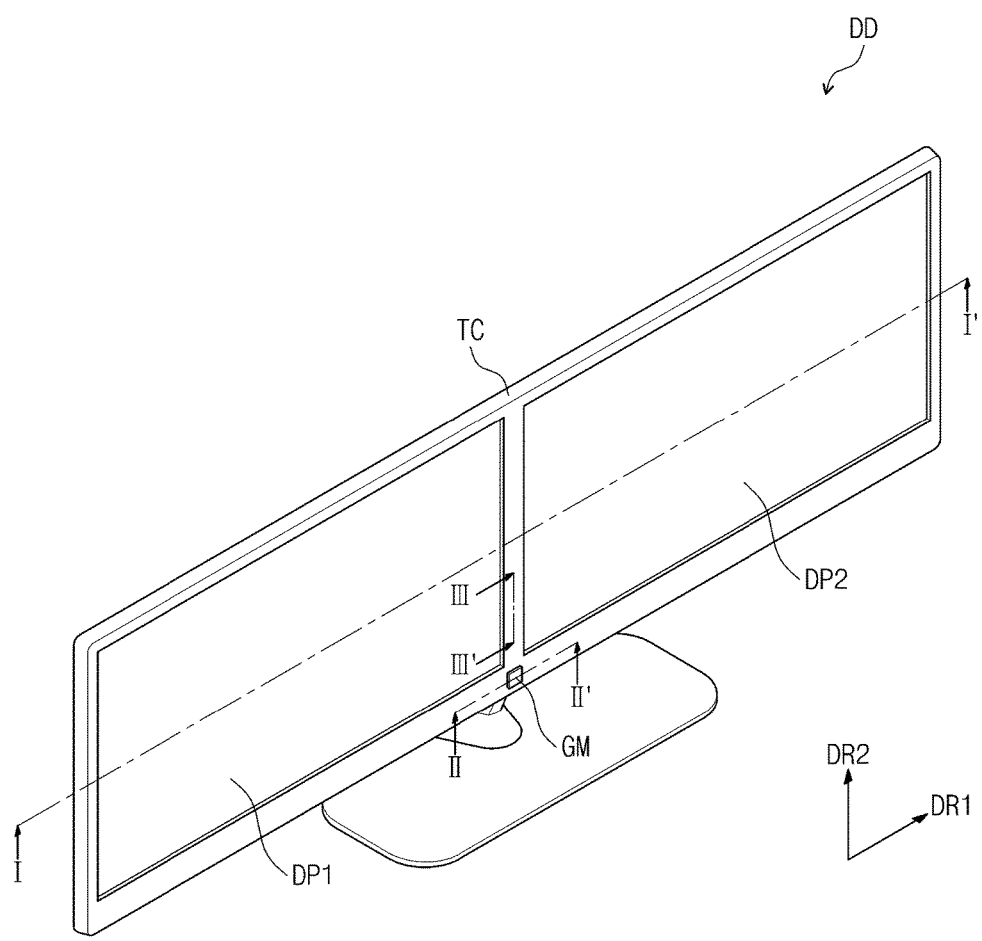
FIG. 1 is a perspective view showing an exemplary embodiment of a display device according to the invention.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "dudes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" "top," may be used herein to describe one element's relationship to another element as illustrated in the Figures. It will be understood that relative terms, are intended to encompass different orientations of the device in addition to the orientation depicted in the Figures. For example, if the device in one of the figures is turned over elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20% 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the invention will be explained in detail with reference to the accompanying drawings.

FIG. 1 is a perspective view showing an exemplary embodiment of a display device DD according to the invention.

Referring to FIG. 1, the display device DD includes a first display panel DP1 and a second display panel DP2 to display an image of the display device DD.

In FIG. 1, the display device DD includes two display panels DP1 and DP2, e.g., a dual monitor as a representative example, but the display device DD may include three or more display panels according to other exemplary embodiments.

One or more exemplary embodiment of the display device according to the invention may be applied to a relatively large-sized electronic item including two or more display panels, such as a television set, an outdoor billboard, etc., and may also be applied to relatively small and medium-sized electronic items including two or more display panels, such as a personal computer, a notebook computer, a personal digital assistants, a car navigation unit, a camera, etc., but the invention is not limited thereto or thereby.

Figure 2:
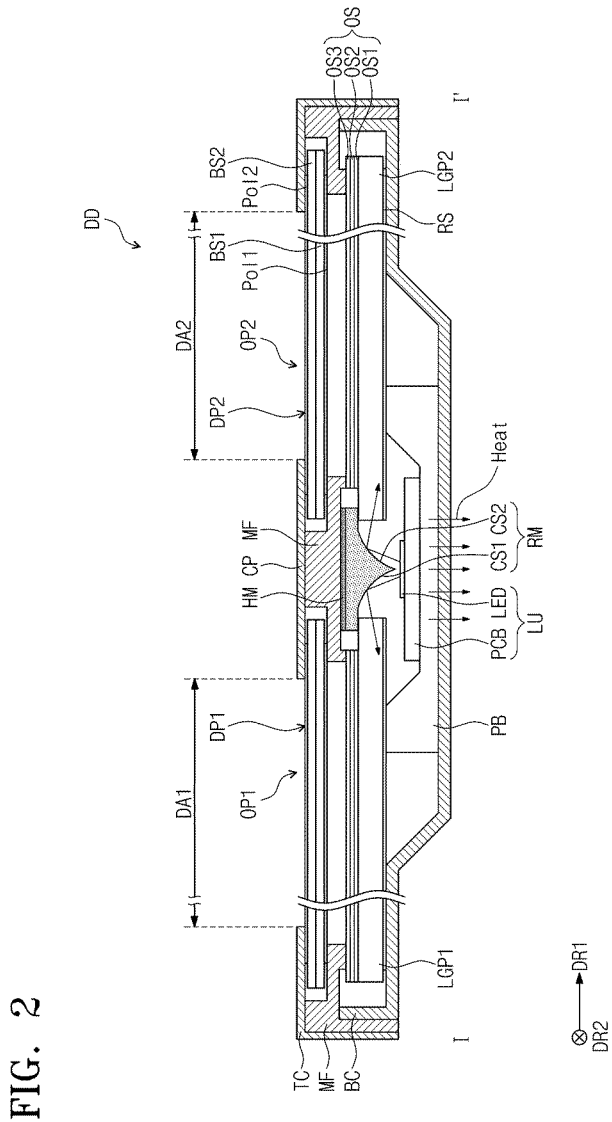
FIG. 2 is a cross-sectional view taken along line I-I' shown in FIG. 1.

FIG. 2 is a cross-sectional view taken along line I-I' shown in FIG. 1.

Referring to FIG. 2, the display device DD includes the first display panel DP1, the second display panel DP2, a first light guide plate LGP1, a second light guide plate LGP2, a light source unit LU and a reflective member RM. The first and second light guide plates LGP1 and LGP2, the light source unit LU and the reflective member RM may collectively define components a backlight unit or backlight assembly of the display device DD.

Each of the first and second display panels DP1 and DP2 includes a first substrate BS1, a second substrate BS2 facing the first substrate BS1, and a liquid crystal layer (not shown) disposed between the first and second substrates BS1 and BS2. The liquid crystal layer includes liquid crystal molecules of which an arrangement is changed in accordance with an electric field formed between the first and second substrates BS1 and BS2. Polarizing plates Pol1 and Pol2 are respectively disposed under and above the first and second display panels DP1 and DP2.

The first light guide plate LGP1 is disposed under the first display panel DP1 and the second light guide plate LGP2 is disposed under the second display panel DP2. The first and second light guide plates LGP1 and LGP2 are disposed to be spaced apart from each other. The first and second light guide plates LGP1 and LGP2 are disposed in a same plane as each other. The first and second light guide plates LGP1 and LGP2 are spaced apart from each other in a first direction DR1.

The first and second light guide plates LGP1 and LGP2 include at least one of polyamide ("PA"), polymethyl methacrylate ("PMMA"), methyl methacrylate-styrene ("MS"), and polycarbonate ("PC"), but should not be limited thereto or thereby.

Optical sheets OS are respectively disposed between the first light guide plate LGP1 and the first display panel DP1 and between the second light guide plate LGP2 and the second display panel DP2. The optical sheets OS include a diffusion sheet OS1, a prism sheet OS2 and a protective sheet OS3. The diffusion sheet OS1 diffuses a light, and the prism sheet OS2 condenses the light diffused by the diffusion sheet OS1 such that the light travels in a direction close to a normal line direction of each of the first and second display panels DP1 and DP2. The protective sheet OS3 protects the prism sheet OS2 from external impacts. In the illustrated exemplary embodiment, the optical sheets OS include one each of the diffusion sheet OS1, the prism sheet OS2 and the protective sheet OS3, but the number of the diffusion sheet OS1, the prism sheet OS2 and the protective sheet OS3 should not be limited to one. In another exemplary embodiment, for instance, at least one of the diffusion sheet OS1, the prism sheet OS2 and the protective sheet OS3 may be provided in plural number, or one or more of the diffusion sheet OS1, the prism sheet OS2 and the protective sheet OS3 may be omitted from the optical sheets OS.

A reflective sheet RS is respectively disposed under each of the first and second light guide plates LGP1 and LGP2. The reflective sheet RS reflects the light leaking from each of the first and second light guide plates LGP1 and LGP2 to allow the leaking light to be re-incident to each of the first and second light guide plates LGP1 and LGP2. However, the reflective sheet RS may be omitted according to exemplary embodiments. Where the reflective sheet RS is omitted, a reflective material may be coated on a rear surface of the first and second light guide plates LGP1 and LGP2.

One or more among the optical sheets OPS and the reflective sheet RS may also be considered as components of the backlight unit or backlight assembly of the display device DD, in addition to the first and second light guide plates LGP1 and LGP2, the light source unit LU and the reflective member RM.

A top chassis TC is disposed above the first and second display panels DP1 and DP2 in a thickness direction of the display device DD. The top chassis TC includes or defines a first opening OP1 and a second opening OP2, which are formed through a thickness of the top chassis TC. The first opening OP1 exposes a first display area DA1 of the first display panel DP1 and the second opening OP2 exposes a second display area DA2 of the second display panel DP2. According to the illustrated exemplary embodiment, one single top chassis TP overlaps both the first and second display panels DP1 and DP2.

A cover portion CP is defined between the first and second openings OP1 and OP2. The cover portion CP covers a boundary area between the first and second display panels DP1 and DP2. The top chassis TC may define the cover portion CP as a portion thereof, such that the top chassis TP and the cover portion form one single top cover member.

The reflective member RM and the light source unit LU are disposed under the cover portion CP. The cover portion CP, the reflective member RM and the light source unit LU are overlapped with each other when viewed in a top plan view. In other words, the cover portion CP, the reflective member RM, and the light source unit LU are overlapped with each other when viewed in a direction substantially parallel to a thickness direction of the display device DD, such as from a viewing side of the display device DD.

The light source unit LU is commonly disposed under the first and second light guide plates LGP1 and LGP2. In an exemplary embodiment, for instance, the light source unit LU is disposed at a position lower than an imaginary plane on which the first and second light guide plates LGP1 and LGP2 are disposed. That is, the light source unit LU is disposed further from the viewing side of the display device DD than the first and second light guide plates LGP1 and LGP2.

The light source unit LU includes a light source LED and a printed circuit board PCB. The printed circuit board PCB is disposed between the light source LED and a bottom chassis BC. The light source LED is mounted on the printed circuit board PCB and receives a driving voltage from the printed circuit board PCB. The light source LED generates and provides the light between the first and second light guide plates LGP1 and LGP2 in response to the driving voltage.

A heat transfer member PB may be further disposed between the printed circuit board PCB and the bottom chassis BC. The heat transfer member PB is disposed on a rear surface of the printed circuit board PCB to discharge a heat Heat generated from the light source LED and the printed circuit board PCB to outside the display device DD. The heat transfer member PB includes a metallic material, such as aluminum, but should not be limited thereto or thereby.

The heat Heat generated from the light source unit LU is transferred to the heat transfer member PB which makes contact with the rear surface of the printed circuit board PCB and is discharged to outside the display device DD through a bottom portion of the bottom chassis BC. According to the illustrated exemplary embodiment, the heat may be advantageously discharged through a relatively simple and direct heat transfer path defined through the heat transfer member PB and the bottom chassis BC. Therefore, the light source unit LU may be driven by a relatively high current since the structure of the display device DD has the advantageous discharge path defined by component within the display device DD. Thus, the first and second light guide plates LGP1 and LGP2 may receive enough light to display the image.

One or more among the reflective member RM and the heat transfer member PB may also be considered as components of the backlight unit or backlight assembly of the display device DD, in addition to the first and second light guide plates LGP1 and LGP2, the light source unit LU and the reflective member RM.

The reflective member RM is disposed on the light source unit LU. The reflective member RM reflects the light provided from the light source unit LU to each of the first and second light guide plates LGP1 and LGP2.

The reflective member RM includes a first curved surface CS1 to reflect the light provided from the light source unit LU to the first light guide plate LGP1 and a second curved surface CS2 to reflect the light provided from the light source unit LU to the second light guide plate LGP2. To define the reflective member RM, a reflective sheet may be attached to each of the first and second curved surfaces CS1 and CS2 of a body member, a reflective material may be coated on each of the first and second curved surfaces CS1 and CS2 of the body member or the body member itself may include a reflective material. The reflective sheet may include white film, or silver reflective film, but should not be limited thereto or thereby.

In the thickness direction of the display device, the first curved surface CS1 is curved toward the light source unit LU from an upper surface of the first light guide plate LGP1 and the second curved surface CS2 is curved toward the light source unit LU from an upper surface of the second light guide plate LGP2. That is, the reflective member RM may be extended to be disposed on and commonly overlap the upper surface of each of the first and second light guide plates LGP1 and LGP2 which are spaced apart from each other. Accordingly, the reflective member RM may reduce or effectively prevent the light generated by the light source unit LU from leaking as not passing through the first and second light guide plates LGP1 and LGP2.

The first and second curved surfaces CS1 and CS2 may have a substantially concave shape. Therefore, the light generated by the light source unit LU is reflected by the concave surface of each of the first and second curved surfaces CS1 and CS2 and is respectively incident to of the first and second light guide plates LGP1 and LGP2.

A mold frame MF supports thereon an edge of the first display panel DP1, an edge of the second display panel DP2 and an edge of the top chassis TC. According to the illustrated exemplary embodiment, one single mold frame MF supports thereon both the first and second display panels DP1 and DP2.

According to the illustrated exemplary embodiment, the display device DD including two display panels, e.g., the first and second display panels DP1 and DP2, includes one single mold frame MF, one single top chassis TC (such as defining the cover portion CP), and one single light source unit LU. That is, except for the display panels DP1 and DP2, each of the other component elements of the display device DD is singular provided regardless of the number of the display panels DP1 and DP2. Thus, since a number of the component elements of the display device DD is respectively smaller than a number of the display panels, an overall manufacturing cost of the display device DD may be reduced.

Figure 3:
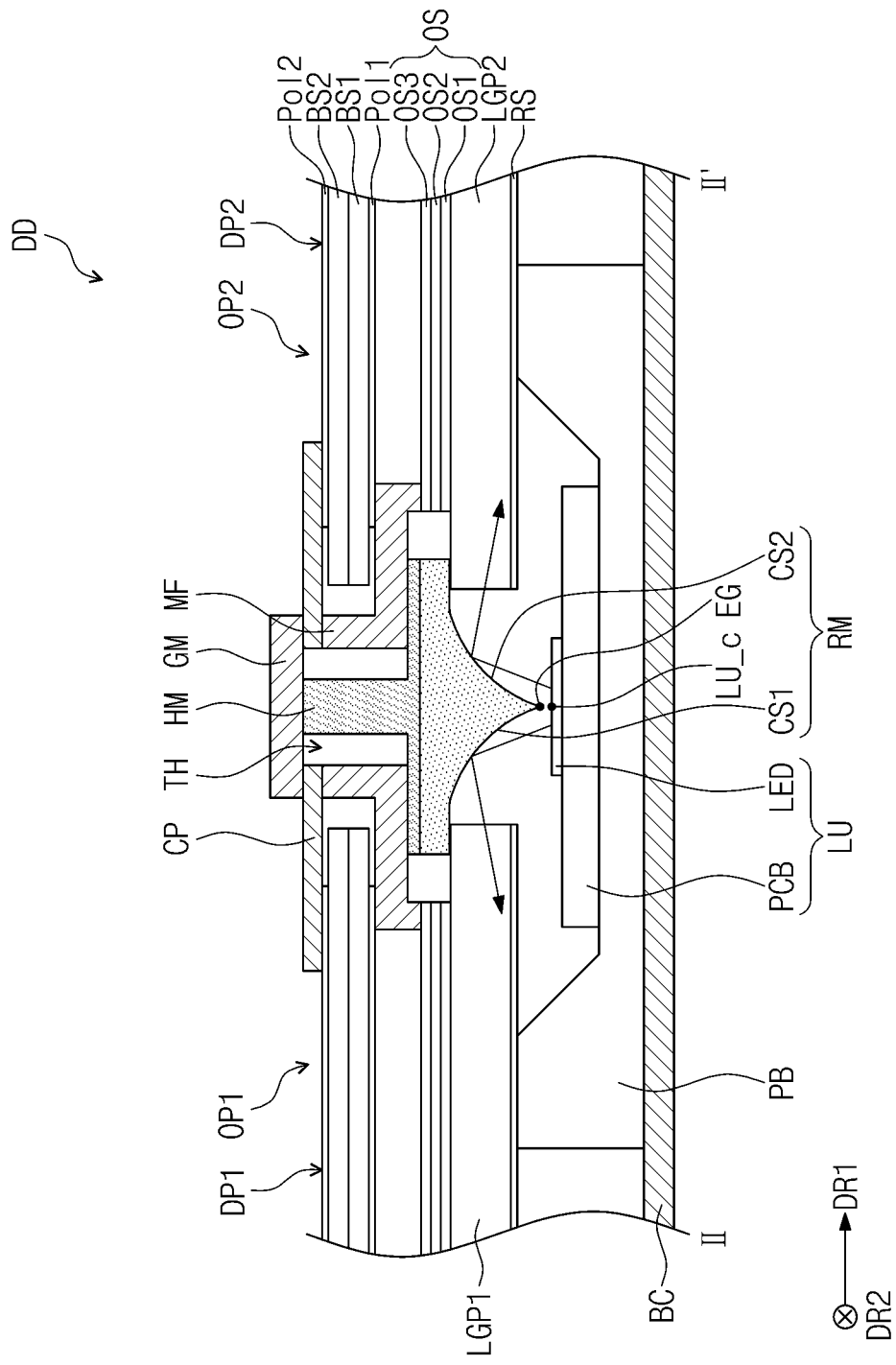
FIG. 3 is a cross-sectional view taken along line II-II' shown in FIG. 1.

FIG. 3 is a cross-sectional view taken along line II-II' shown in FIG. 1.

Referring to FIG. 3, a user which operates the display device DD may control a position of the reflective member RM with respect to the light source unit LU using a guide member GM. The light source unit LU may be stationary (e.g., not moveable) within the display device DD. The user may control an amount of the light provided to the first display panel DP1 and an amount of the light provided to the second display panel DP2 by controlling the position of the reflective member RM within the display device DD.

The guide member GM is connected to the reflective member RM such as through a holding member HM. In the illustrated exemplary embodiment, the guide member GM, the holding member HM and the reflective member RM are separate elements from each other, but should not be limited thereto or thereby. In an exemplary embodiment, for instance, the holding member HM and the reflective member RM may be integrally formed with each other, the holding member HM and the guide member GM may be integrally formed with each other, or the guide member GM, the holding member HM and the reflective member RM may be integrally formed with each other. As used herein, to be integrally formed, one element may extend to define another element. That is, one among the guide member GM, the holding member HM and the reflective member RM may extend to define another one among the guide member GM, the holding member HM and the reflective member RM.

The cover portion CP of the top chassis defines a thru-hole TH extending through a thickness thereof. The mold frame MF defines a thru-hole TH extending into a thickness thereof. The thru-hole TH of the cover portion CP and the mold frame MF are aligned with each other to define the thru-hole TH indicated in FIG. 3. The holding member HM penetrates the thru-hole TH formed through the cover portion CP of the top chassis TC and the thru-hole TH formed through a portion of the mold frame MF, which is overlapped with the cover portion CP. A first end of the holding member HM is coupled to the guide member GM disposed on (e.g., outside) the cover portion CP.

The positions and the shapes of the guide member GM and the holding member HM should not be limited to those shown in FIG. 3 as long as the guide member GM and the holding member HM are connected to the reflective member RM to control the position of the reflective member RM.

Through operation or movement of the guide member which is attached to the reflective member RM via the holding member HM, the reflective member RM may be moved in a direction toward the first light guide plate LGP1 from the second light guide plate LGP2 and in a direction toward the second light guide plate LGP2 from the first light guide plate LGP1. Since a dimension of the holding member HM and the reflective member RM in the first direction DR1 is smaller than an overall dimension of the space defined between the optical sheets OPS and/or the mold frame MF, the holding member HM and the reflective member RM may be translated in the first direction DR1. In an exemplary embodiment, for instance, where the first and second light guide plates LGP1 and LGP2 are spaced apart from each other in the first direction DR1, the reflective member RM may move in a direction substantially parallel to the first direction DR1.

As shown in FIG. 3, an edge EG of the reflective member RM is defined at which the first curved surface CS1 meets with the second curved surface CS2 of the reflective member RM. Considering the view of FIG. 2 at line I-I' in FIG. 1 and the view of FIG. 3 at line II-II' of FIG. 1, the edge extends from a lower portion of the display device DD (at the guide member GM in FIG. 1) toward an upper portion of the display device DD. In the top plan view of the display device DD, with reference to the edge EG defined by the reflective member RM, the amount of the light provided to the first light guide plate LGP1 at one side of the edge EG may be substantially the same as the amount of the light provided to the second light guide plate LGP2 at an opposite side of the edge EG.

According to the illustrated exemplary embodiment, the amount of the light provided to the first and second light guide plates LGP1 and LGP2 may be easily controlled by controlling the position of the reflective member RM. The user may control a brightness of the image displayed in each of the first and second display panels DP1 and DP2 by controlling the position of the reflective member RM within the display device DD from outside the display device DD.

Figure 4:
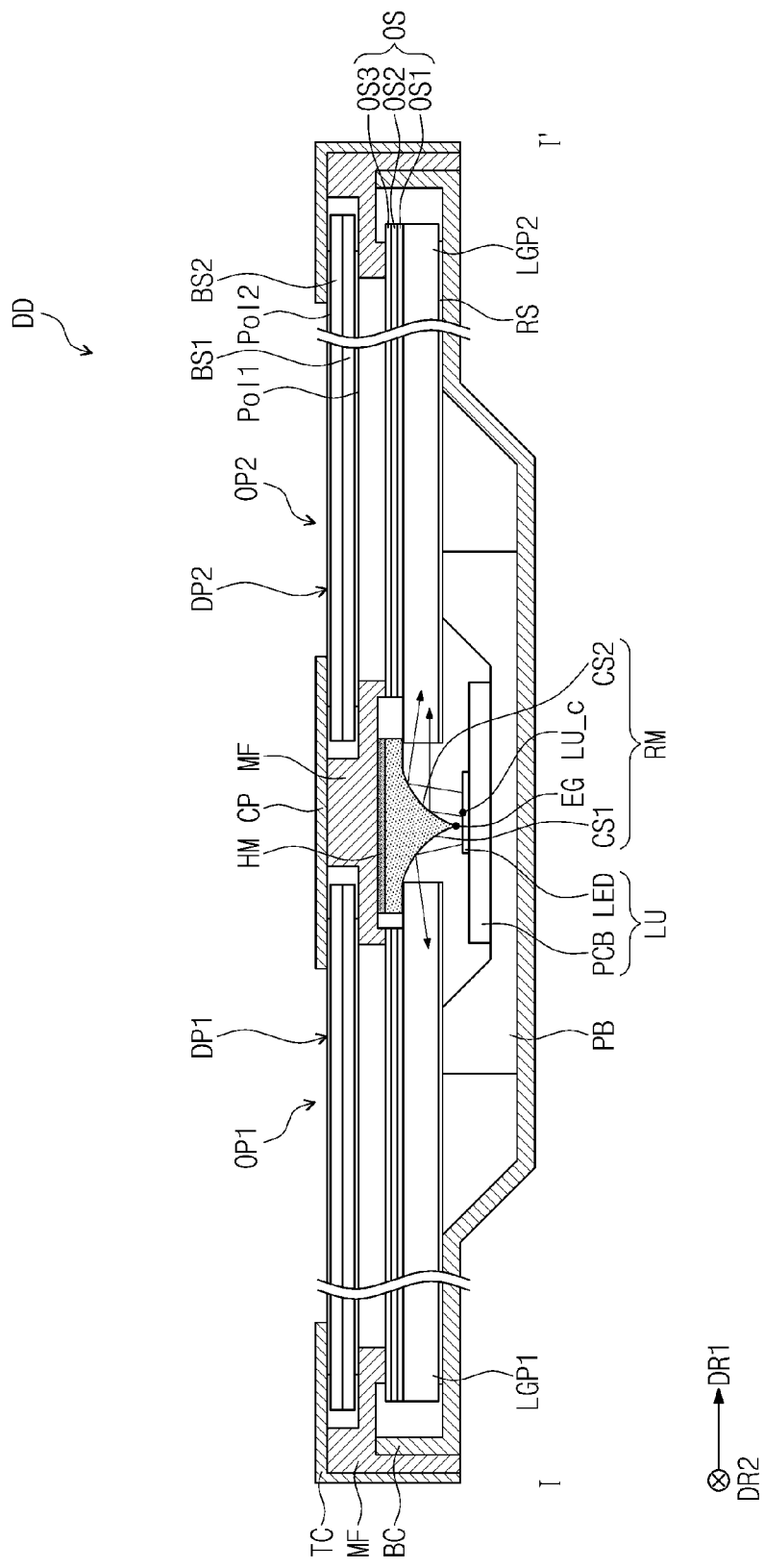
FIG. 4 is another cross-sectional view taken along line I-I' shown in FIG. 1.

FIG. 4 is another cross-sectional view taken along line I-I' shown in FIG. 1.

With reference to the position of the reflective member RM in FIG. 2 with respect to the first and second light guide plates LGP1 and LGP2, FIG. 4 shows a state of the display device DD in which the reflective member RM shown in FIG. 2 is closer to the first light guide plate LGP1 than the second light guide plate LGP2.

Where the reflective member RM has been moved to the position as shown in FIG. 4, the edge EG of the reflective member RM may not be overlapped with a center portion LU_c of the light source unit LU. Referring to FIG. 4, an area defined by the second curved surface CS2 overlapping the light source LED in the top plan view may be greater than an area defined by the first curved surface CS1 overlapping the light source LED. Therefore, due to the greater overlapping area described above, the amount of the light reflected by the second curved surface CS2 may be greater than the amount of the light reflected by the first curved surface CS1.

In FIG. 2, the areas respectively defined by the first and second curved surfaces CS1 and CS2 overlapping the light source LED are considered to be the same such that the amount of the light reflected by the first curved surface CS1 is the same as the amount of the light reflected by the second curved surface CS2. Since a position of the reflective member RM in FIG. 4 is changed from that in FIG. 2, the amount of the light reflected by the first curved surface CS1 is different from the amount of the light reflected by the second curved surface CS2.

According to the illustrated exemplary embodiment, the brightness of the image displayed through the first display panel DP1 and the brightness of the image displayed through the second display panel DP2 may be controlled by only moving the reflective member RM with respect to the light source unit LU.

Figure 5:
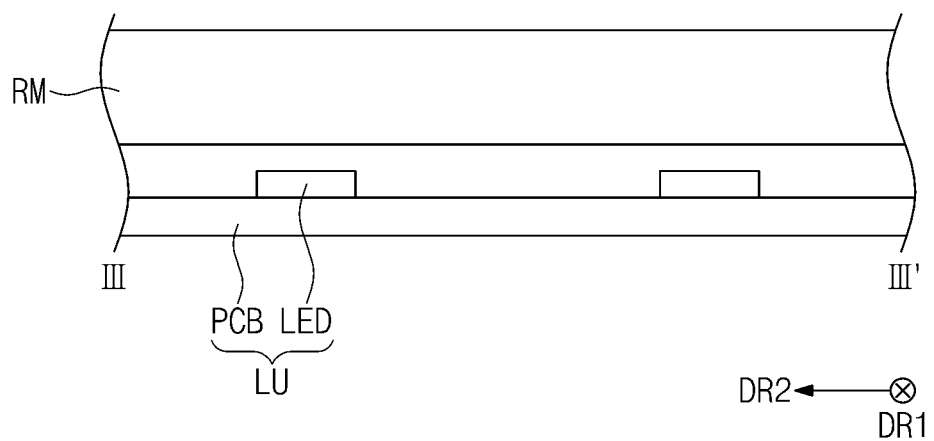
FIG. 5 is a cross-sectional view taken along line III-III' shown in FIG. 1.

FIG. 5 is a cross-sectional view taken along line shown in FIG. 1. For convenience of explanation, FIG. 5 shows only the light source unit LU and the reflective member RM of the display device DD.

Referring to FIGS. 2 and 5, the light source LED is provided in a plural number. The light sources LED are arranged in a second direction DR2. The second direction DR2 may be perpendicular to the first direction DR1. A thickness direction of the display device DD may be orthogonal to both the first and second directions DR1 and DR2. Thus, since the light sources LED are arranged in the second direction DR2, the reflective member RM may extend in the second direction DR2 and each of the first and second curved surfaces CS1 and CS2 thereof may extend in the second direction DR2 such that light from the light sources LED arranged in the second direction DR2 can be reflected to a respective light guide plate.

Figure 6:
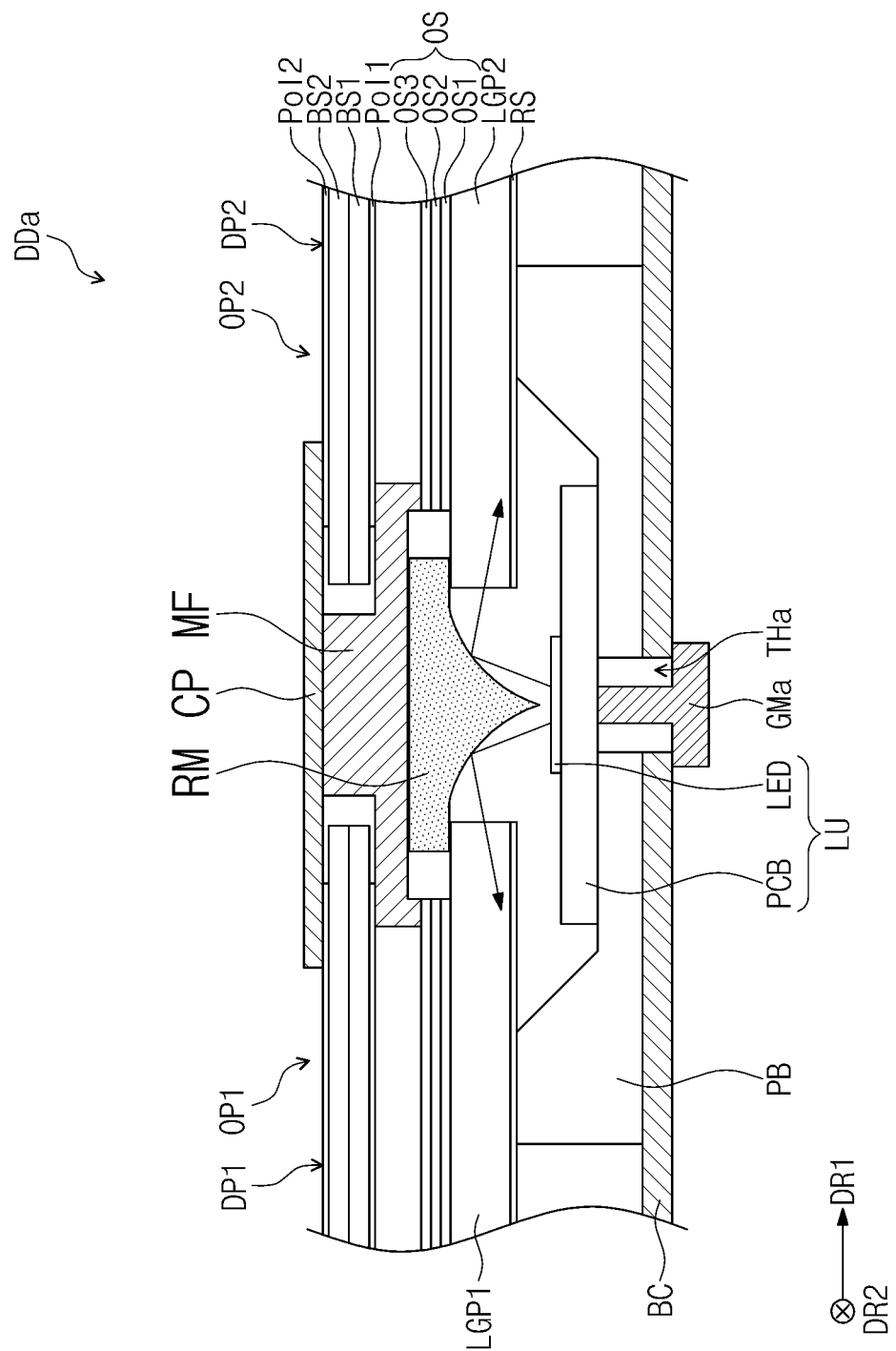
FIG. 6 is a cross-sectional view showing another exemplary embodiment of a display device according to the invention.

FIG. 6 is a cross-sectional view showing another exemplary embodiment of a display device DDa according to the invention. FIG. 6 may be a view taken along II-IF of FIG. 1.

The user who operates the display device DDa may control a position of a light source unit LU with respect to a reflective member RM using a guide member GMa, and thus may control an amount of light provided to the first and second display panels DP1 and DP2. The reflective member RM may be stationary (e.g., not moveable) within the display device DD. The reflective member RM may be directly attached to the mold frame MF. Accordingly, the holding member HM shown in FIG. 2 may be omitted.

Therefore, in one or more exemplary embodiment of the invention, at least one of the light source unit LU and the reflective member RM is movable with respect to the other one of the light source unit LU and the reflective member RM, in a direction parallel to the first direction DR1.

The bottom chassis BC and the heat transfer member PB may each define a thru-hole THa through a thickness thereof. The guide member GMa is coupled to a printed circuit board PCB through the thru-hole THa formed through the bottom chassis BC and the heat transfer member PB which are aligned with each other to form the collective thru-hole THa indicated in FIG. 6. In the illustrated exemplary embodiment, the guide member GMa and the printed circuit board PCB are separate members from each other, but should not be limited thereto or thereby. In an exemplary embodiment, for instance, the guide member GMa and the printed circuit board PCB may be integrally formed with each other according to another embodiment. As used herein, to be integrally formed, one element may extend to define another element. That is, one among the guide member GMa and the printed circuit board PCB may extend to define another one among the guide member GMa and the printed circuit board PCB.

The user may control the position of the light source unit LU by moving the guide member GMa in a direction substantially parallel to the first direction DR1. Since an overall dimension of the light source unit LU in the first direction DR1 is smaller than an overall dimension between sidewalls of the heat transfer member PB, the light source unit LU may be translated in the first direction DR1. The change in position of the light guide unit LU relative to the reflective member RM changes an overlapping area defined thereby to change an amount of light reflected by curved surfaces of the reflective member RM. In an exemplary embodiment, for instance, when the light source unit LU moves in a direction towards to the first light guide plate LGP1, the brightness of the image displayed through the first display panel DP1 becomes higher than the brightness of the image displayed through the second display panel DP2.

Figure 7:
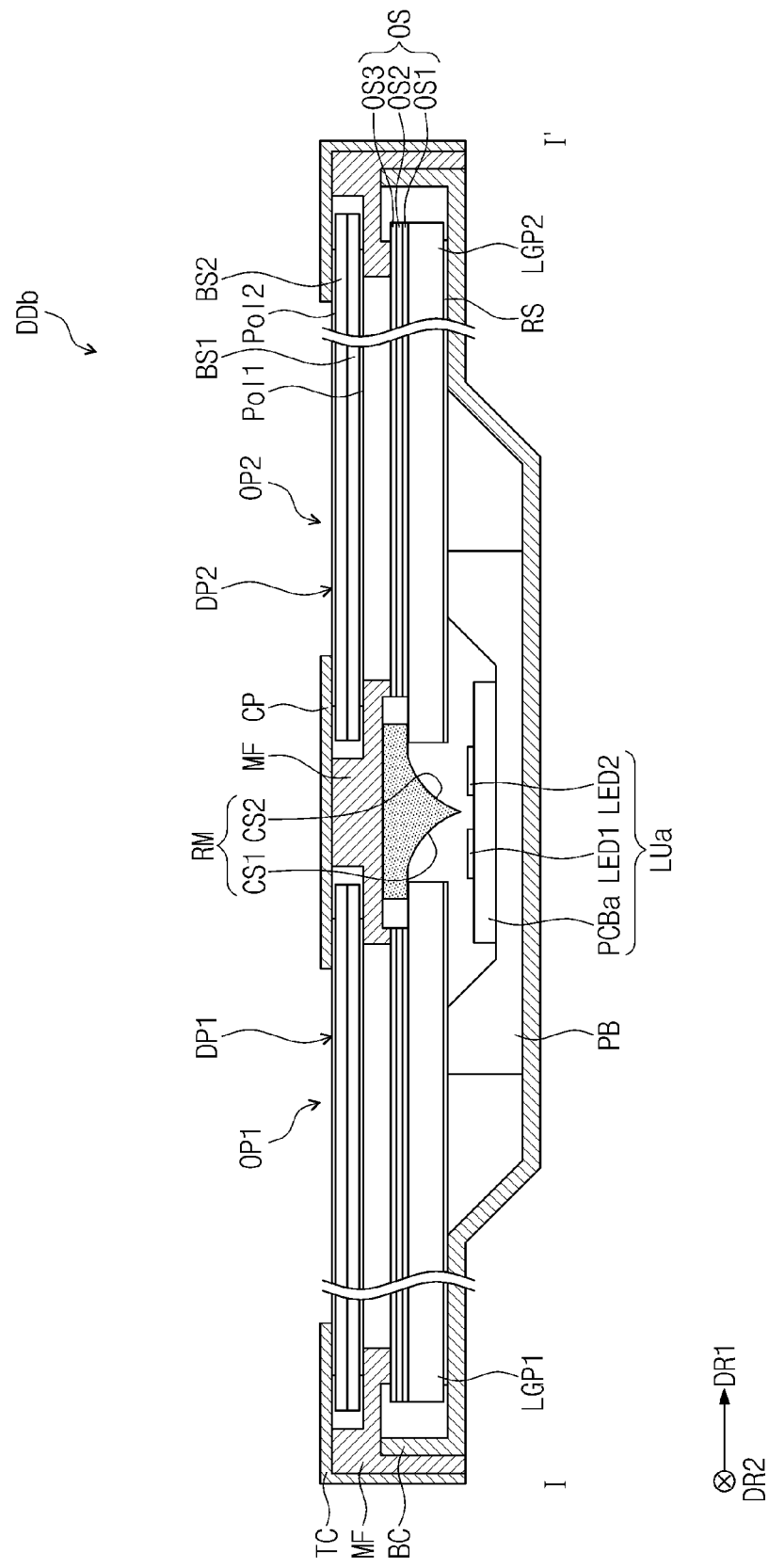
FIG. 7 is a cross-sectional view of still another exemplary embodiment of a display device taken along line I-I' shown in FIG. 1.

FIG. 7 is a cross-sectional view of still another exemplary embodiment of a display device taken along line I-I' shown in FIG. 1.

Referring to FIG. 7, a display device DDb has the same structure and function as those of the display device DD shown in FIG. 2 except for a light source unit LUa.

The light source unit LUa includes a first light source LED1, a second light source LED2, and a printed circuit board PCBa on which the first and second light sources LED1 and LED2 are mounted.

FIG. 7 shows one first light source LED1 and one second light source, but the first light source LED1 and the second light source LED2 are each provided in plural arranged in the second direction DR2 along the printed circuit board PCBa. In the first direction DR1, the first light sources LED1 arranged in the second direction DR2 are spaced apart from the second light sources LED2 arranged in the second direction DR2.

The first light sources LED1 and the second light sources LED2 emit lights to a single reflective member RM. The reflective member RM reflects the lights provided from the first and second light sources LED1 and LED2 to the first and second light guide plates LGP1 and LGP2, respectively.

One of the light source unit LUa and the reflective member RM may move with respect to the other of the light source unit LUa and the reflective member RM, in a direction substantially parallel to the first direction DR1. The change in position of the light guide unit LUa relative to the reflective member RM changes an overlapping area defined thereby to change an amount of light reflected by curved surfaces of the reflective member RM. Since a positional relationship between the light source unit LUa and the reflective member RM is changeable, the amount of the light incident to the first light guide plate LGP1 and the amount of the light incident to the second light guide plate LGP2 may be changed.

Figure 8:
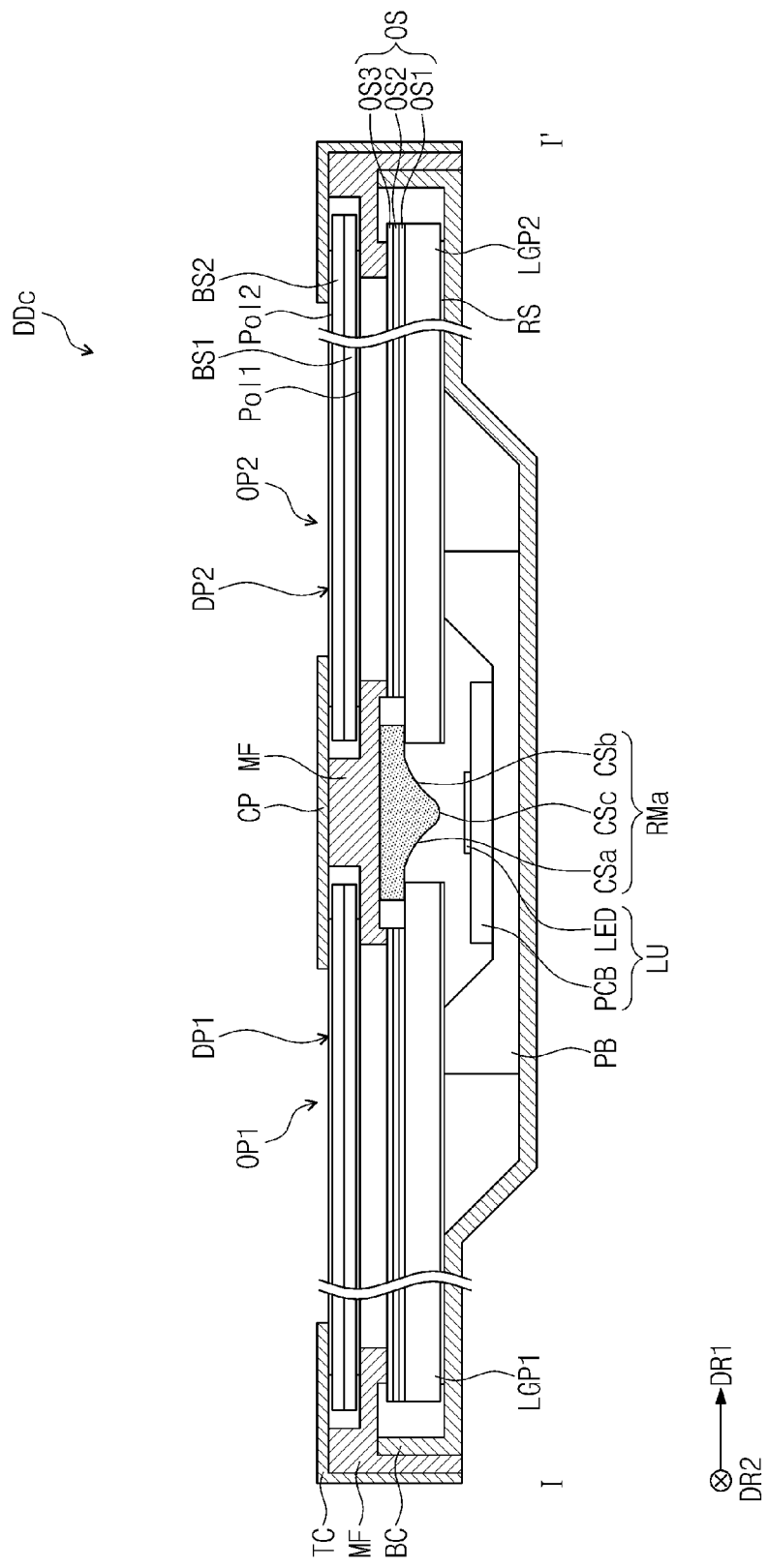
FIG. 8 is a cross-sectional view of yet another exemplary embodiment of a display device taken along line I-I' shown in FIG. 1.

FIG. 8 is a cross-sectional view of yet another exemplary embodiment of a display device taken along line I-I' shown in FIG. 1.

Referring to FIG. 8, a display device DDc has the same structure and function as those of the display device DD shown in FIG. 2 except for a reflective member RMa.

The reflective member RMa includes or defines a first curved surface CSa reflecting the light provided from the light source unit LU to the first light guide plate LGP1, a second curved surface CSb reflecting the light provided from the light source unit LU to the second light guide plate LGP2, and a third curved surface CSc connecting the first curved surface CSa and the second curved surface CSb to each other. The third curved surface CSc faces the light source unit LU.

The reflective member RM shown in FIG. 2 has a substantially pointed shape at the position at which the first curved surface CS1 meets the second curved surface CS2 (e.g., the edge EG), but the reflective member RMa shown in FIG. 8 has a substantially round shape due to the third curved surface CSc extended between the first and second curved surfaces CSa and CSb. Similar to that described above for the edge EG (refer to FIG. 3), the third curved surface CSc may extend in the second direction DR2.

Figure 9:
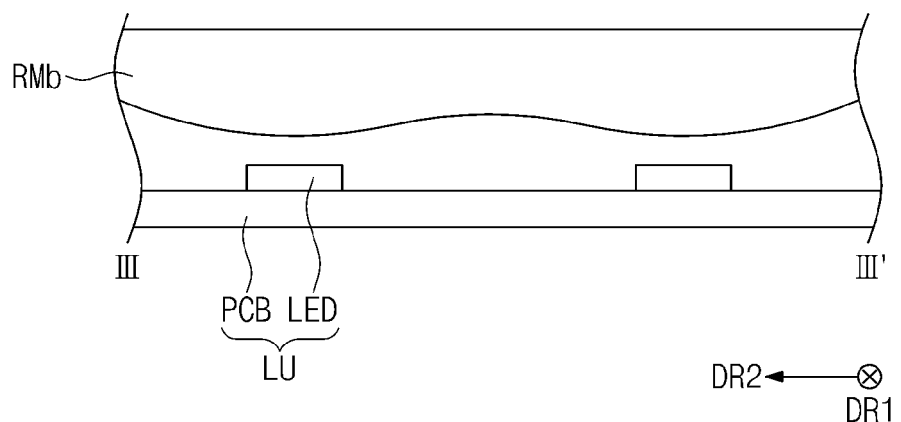
FIG. 9 is a cross-sectional view of yet another exemplary embodiment of a display device taken along line III-III' shown in FIG. 1.

FIG. 9 is a cross-sectional view of yet another exemplary embodiment of a display device taken along line shown in FIG. 1. For convenience of explanation, FIG. 5 shows only the light source unit LU and a reflective member RMb of the display device DD.

Referring to FIG. 2 and FIG. 9, the light source LED is provided in a plural number. The light sources LED are arranged in a second direction DR2. Thus, since the light sources LED are arranged in the second direction DR2, the reflective member RMb may extend in the second direction DR2.

In the second direction DR2, the reflective member RMb has a shape in which a portion thereof facing or overlapping the light source LED is protruded further than a remaining portion thereof not facing or overlapping the light source LED. According to the illustrated exemplary embodiment, since the portion of the reflective member RMb, which faces the light source LED, is relatively more protruded than the remaining portion of the reflective member RMb, which does not face the light source LED, the light provided from the light source LED may be more directly provided to the reflective member RMb and therefore more easily provided to the first and second light guide plates LGP1 and LGP2 after the reflective member RMb splits the light provided from the light source LED.

Figure 10:
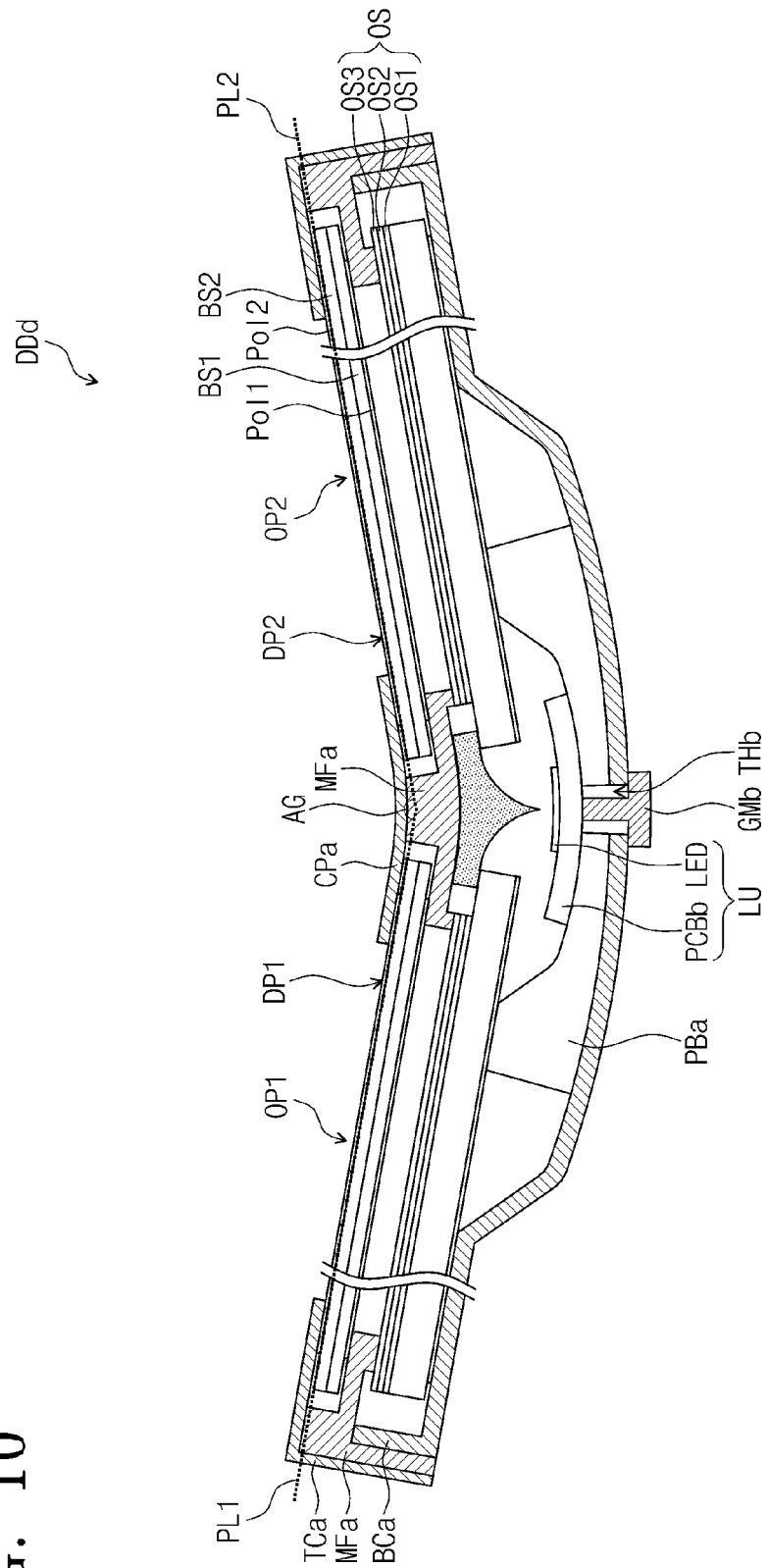
FIG. 10 is a cross-sectional view of yet another exemplary embodiment of a display device showing a display device according to an exemplary embodiment of the present disclosure.

FIG. 10 is a cross-sectional view showing yet another exemplary embodiment of a display device DDd according to the invention.

Referring to FIG. 10, the display device DDd has the same structure and function as those of the display device DD shown in FIG. 2 except for an angle between the first display panel DP1 and the second display panel DP2. The first and second display panels DP1 and DP2 shown in FIG. 2 are disposed on the same plane. Accordingly, the angle between the first and second display panels DP1 and DP2 is about 180 degrees.

The first display panel DP1 shown in FIG. 10 is disposed on a plane substantially parallel to a first imaginary plane PL1 (shown with dotted line in FIG. 10) and the second display panel DP2 is disposed on a plane substantially parallel to a second imaginary plane PL2 (shown with dotted line in FIG. 10). An angle AG between the first imaginary plane PL1 and the second imaginary plane PL2 is smaller than about 180 degrees.

As elements common to the first and second display panels DP1 and DP2 disposed at the angle AG, each of a single top chassis TCa, a single mold frame MFa and a single bottom chassis BCa has a curved or bent shape to correspond to the angle AG. A single heat transfer member PBa common to both the first and second display panels DP1 and DP2 is disposed on the bottom chassis BCa and also may have a curved shape to correspond to the angle AG. A single printed circuit board PCBb to both first and second light guide plates LGP1 and LGP2 is disposed on the heat transfer member PBa and may have a curved shape to correspond to the angle AG.

In the illustrated exemplary embodiment, the display device DDd may further include a guide member GMb coupled to the printed circuit board PCBb. The guide member GMb passes through a thru-hole THb formed through the bottom chassis BCa and the heat transfer member PBa. One end of the guide member GMb is exposed outside the rear surface of the bottom chassis BCa.

The user may control the position of the light source unit LU relative to the reflective member by using the guide member GMb exposed to outside the rear surface of the bottom chassis BCa to change an overlapping area of the light source unit LU and the reflective member, and as a result, the amount of the light provided to the first and second display panels DP1 and DP2 may be controlled.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
   a first display panel which displays an image with light;
   a second display panel which displays an image with the light and is spaced apart from the first display panel;
   a first light guide plate which is disposed under the first display panel and provides the light thereto;
   a second light guide plate which is disposed under the second display panel and provides the light thereto;
   a light source unit disposed under the first and second light guide plates, wherein the light source unit generates and provides the light to the first and second light guide plates; and
   a reflective member disposed on the light source unit and disposed between the first and second light guide plates, the reflective member defining a first curved surface thereof which reflects the light from the light source to the first light guide plate and a second curved surface thereof which reflects the light from the light source to the second light guide plate,
   wherein
   in a thickness direction of the display device, the reflective member is overlapped with the light source unit, and
   the first light guide plate, the reflective member, and the second light guide plate are arranged in order in a direction perpendicular to the thickness direction.

2. The display device of claim 1, wherein in the thickness direction of the display device,
   the first curved surface of the reflective member extends in a direction toward the light source unit from an upper surface of the first light guide plate which is closest to the first display panel, and
   the second curved surface extends in a direction toward the light source unit from an upper surface of the second light guide plate which is closest to the second display panel.

3. The display device of claim 1, wherein in the thickness direction of the display device, each of the first and second curved surfaces has a concave shape.

4. The display device of claim 1, wherein
   the first light guide plate is spaced apart from the second light guide plate in a first direction, and each of the first and second curved surfaces is curved along the first direction and extends in a second direction crossing the first direction.

5. The display device of claim 1, wherein the reflective member disposed between the first and second light guide plates is movable in a direction toward the first light guide plate from the second light guide plate and in a direction toward the second light guide plate from the first light guide plate.

6. The display device of claim 1, wherein the light source unit disposed under the first and second light guide plates is movable in a direction toward the first light guide plate from the second light guide plate and in a direction toward the second light guide plate from the first light guide plate.

7. The display device of claim 1, further comprising a bottom chassis in which is accommodated the first light guide plate, the second light guide plate, the light source unit disposed under the first and second light guide plates, and the reflective member disposed between the first and second light guide plates.

8. The display device of claim 7, wherein the light source unit disposed under the first and second light guide plates comprises:
    a light source which generates and emits the light to the reflective member disposed between the first and second light guide plates; and
    a printed circuit board on which the light source is mounted, the printed circuit board disposed between the light source and the bottom chassis.

9. The display device of claim 8, further comprising a heat transfer member disposed between the printed circuit board and the bottom chassis, the heat transfer member commonly disposed under the first and second light guide plates.

10. The display device of claim 1, further comprising a top chassis commonly disposed on the first and second display panels spaced apart from each other,
    wherein
    the spaced apart first and second display panels define a space therebetween, and
    the top chassis defines:
        a first opening thereof which exposes a display area of the first display panel,
        a second opening thereof which exposes a display area of the second display panel, and
        a cover portion thereof which is disposed overlapping the space between the first and second display panels.

11. The display device of claim 10, wherein in a top plan view of the display device, the cover portion of the top chassis, the reflective member disposed between the first and second light guide plates, and the light source unit are overlapped with each other.

12. The display device of claim 1, wherein the first display panel and the second display panel are disposed in a same plane.

13. The display device of claim 1, wherein
    the first display panel is disposed in a first imaginary plane,
    the second display panel is disposed in a second imaginary plane different from the first imaginary plane, and
    an angle between the first imaginary plane and the second imaginary plane is smaller than about 180 degrees.

14. The display device of claim 1, wherein
    the first light guide plate is spaced apart from the second light guide plate in a first direction, and
    the light source unit comprises plural light sources which generate and emit the light to the reflective member disposed between the first and second light guide plates, the plural light sources comprising:
        first light sources arranged in a second direction crossing the first direction;
        second light sources arranged in the second direction the second light sources spaced apart from the first light sources in the first direction; and
        a printed circuit board on which the first and second light sources are mounted.

15. The display device of claim 1, wherein in the thickness direction, the light source unit, each of the first and second light guide plates, and each of the first and second display panels, are arranged in order.

16. The display device of claim 1, wherein in the thickness direction, the first light guide plate does not overlap with the second light guide plate.

17. A display device comprising:
    a first display panel which displays an image with light;
    a second display panel which displays an image with the light and is spaced apart from the first display panel in a first direction;
    a first light guide plate which is disposed under the first display panel and provides the light to the first display panel;
    a second light guide plate which is disposed under the second display panel and provides the light to the second display panel;
    a light source unit commonly disposed under the first and second light guide plates, wherein the light source unit generates and provides the light to the first and second light guide plates; and
    a reflective member disposed on the light source unit and commonly disposed on the first and second light guide plates, wherein the reflective member reflects the light from the light source unit to the first and second light guide plates,
    wherein at least one of the light source unit and the reflective member is movable with respect to the other one of the light source unit and the reflective member, in a direction parallel to the first direction.

18. The display device of claim 17, wherein the reflective member defines in a thickness direction of the display device:
    a first surface which reflects the light from the light source unit to the first light guide plate, the first surface curved to the light source unit from an upper surface of the first light guide plate which is closest to the first display panel; and
    a second surface which reflects the light from the light source unit to the second light guide plate, the second surface curved to the light source unit from an upper surface of the second light guide plate.

19. The display device of claim 18, wherein
    the reflective member defines an edge thereof at which the first surface meets the second surface, the edge extending in a second direction crossing the first direction,
    in a state of the display device in which the edge is overlapped with a center portion of the light source unit in a top plan view of the display device, an amount of the light reflected from the reflective member to the first light guide plate is equal to an amount of the light reflected from the reflective member to the second light guide plate, and
    in a state of the display device in which the edge is not overlapped with the center portion of the light source unit in the top plan view of the display device, the amount of the light reflected from the reflective member to the first light guide plate is different from the amount of the light reflected from the reflective member to the second light guide plate.

20. The display device of claim 17, further comprising a top chassis commonly disposed on the first and second display panels spaced apart from each other,
wherein
the spaced apart first and second display panels defining a space therebetween, and
the top chassis defines:
  a first opening thereof which exposes a display area of the first display panel,
  a second opening thereof which exposes a display area of the second display panel, and
  a cover portion thereof which is disposed overlapping the space between the first and second display panels.

21. The display device of claim 20, wherein in a top plan view of the display device, the cover portion of the top chassis, the reflective member commonly disposed on the first and second light guide plates, and the light source unit commonly disposed under the first and second light guide plates are overlapped with each other.

22. A backlight unit comprising:
a first light guide plate;
a second light guide plate spaced apart from the first light guide plate;
a reflective member disposed between the first light guide plate and the second light guide plate; and
a light source unit disposed under the first and second light guide plates, wherein the light source unit generates and provides the light to the reflective member,
wherein
the reflective member defines:
  a first surface thereof extending from an upper surface of the first light guide plate to the light source unit to face the first light guide plate; and
  a second surface thereof extending from an upper surface of the second light guide plate to the light source unit to face the second light guide plate, the second surface being connected to the first surface,
in a thickness direction of the backlight unit, the reflective member is overlapped with the light source unit, and
the first light guide plate, the reflective member, and the second light guide plate are arranged in order in a direction perpendicular to the thickness direction.

* * * * *